June 3, 1930.  J. C. MACFARLANE ET AL  1,761,836
DYNAMO ELECTRIC MACHINE
Filed April 19, 1928   2 Sheets-Sheet 1

INVENTORS
JAMES COLQUHOUN MACFARLANE.
WILLIAM ALLAN MACFARLANE,
BY
ATTORNEYS:

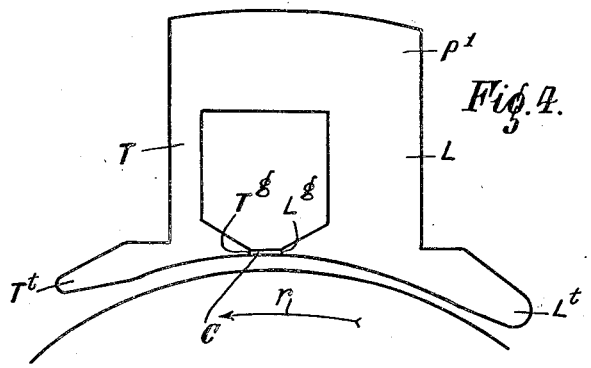
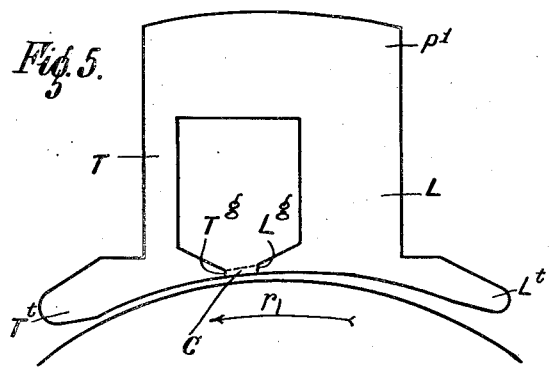
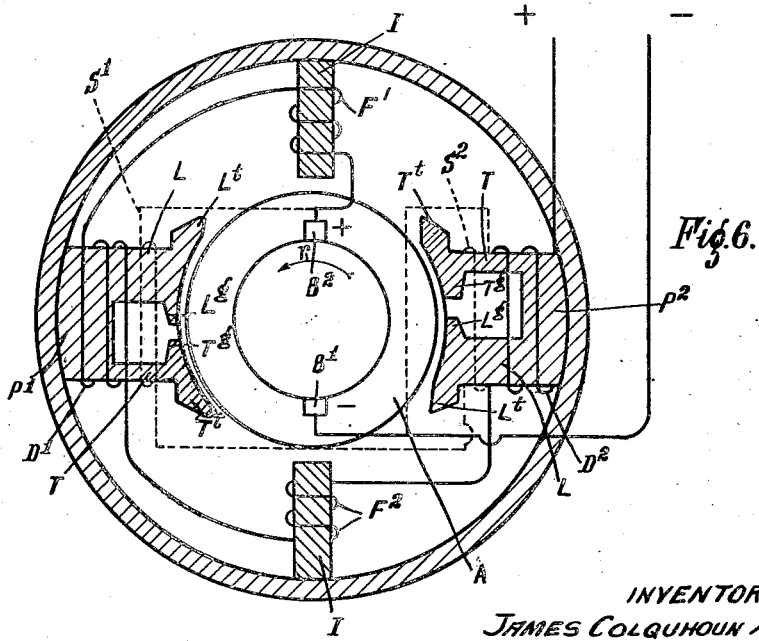

Patented June 3, 1930

1,761,836

UNITED STATES PATENT OFFICE

JAMES COLQUHOUN MACFARLANE AND WILLIAM ALLAN MACFARLANE, OF GLASGOW, SCOTLAND

DYNAMO-ELECTRIC MACHINE

Application filed April 19, 1928, Serial No. 271,124, and in Great Britain April 25, 1927.

This invention relates to dynamo-electric machines of the so-called 'constant current type' in which the current of the dynamo under short circuited conditions is limited to a pre-determined amount, and has for its object the provision of a simpler and cheaper machine than has hitherto been found possible in machines of this type for a given duty. Dynamos made in accordance with our invention are particularly adapted for use as generators for arc welding work, but they may be used for any other purpose for which constant current dynamos are normally used.

According to this invention, each pole of the dynamo is divided into two parts, one part having a high magnetic reluctance path and the other part having a low magnetic reluctance path, which paths are so proportioned that, under short circuit conditions, the cross flux due to armature reaction will saturate the high magnetic reluctance path of each pole to such an extent that the total flux passing through the armature from pole to pole will be reduced to an amount which is just sufficient to keep the short circuit current circulating in the armature winding.

The poles will be divided into two parts by a division extending parallel or approximately parallel to the axis of the armature, the part pole at the trailing edge of the pole being so much smaller in cross section than the part pole at the leading edge, and the dynamo otherwise so constructed that, under short circuit conditions, the flux in the part pole at the leading edge will be overwhelmed and driven back by the cross flux due to the armature reaction, while the part pole at the trailing edge will be so saturated that the inter-polar flux will be reduced to an amount which is just sufficient to maintain the short circuit current circulating in the armature windings.

In order that the invention may be clearly understood and readily carried into practice the same will now be described with reference to the accompanying drawings showing certain explanatory diagrams and practical embodiments, by way of example, wherein:—

Fig. 1 shows in diagrammatic form one of the poles of a dynamo made to our invention together with a diagram of the magneto motive forces produced by the field and armature windings, the pole being developed out flat so that the theoretical diagram of magneto motive forces may be more readily followed. It should of course be understood that the dimensions of the pole shown in Fig. 1 are exaggerated for the purpose of making quite clear the operation of our invention.

Figs. 2 and 3 show the practical methods of forming the pole.

Figs. 4 and 5 show the pole arranged to have a larger airgap under one horn than under the other for the purpose of altering the characteristics of the machine to obtain the effect desired.

Fig. 6 is a diagram giving the field connections for a welding dynamo according to our invention.

Referring to Fig. 1 the pole $P^1$ is provided with two horns T and L, L being the leading pole horn and T the trailing pole horn, the armature moving in the direction of the arrow $r$. $B^1$, $B^2$, are the brushes and the line joining these represents the periphery of the armature developed out flat. For convenience of description the edges of the polar faces on the horns are designated $Tt$—$Tg$—$Lg$—$Lt$.

The field winding on the pole generates a magneto motive force which is in the direction shown by the small arrows ($a$). If there were no drop in magneto motive force due to the flux passing through or across the pole this magneto motive force would be uniform across the polar faces $Tt$—$Tg$ and $Lg$—$Lt$ and in the diagram of magneto motive forces is represented by the rectangles A. B. P. Y. and M. N. G. F. wherein the heights A. B. M. N. etc. represent the value of the magneto motive force due to the field (hereinafter referred to as the 'polar' magneto motive force).

When the armature is carrying current it will also set up a magneto motive force, the direction of which is at right angles, electrically, to the polar magneto motive force and in the case of a dynamo will have the positive value KL in line with the positive brush and the negative value JH in line with the negative brush, the point of zero armature magneto motive force being midway between the brushes, that is, on the polar axis. Since the armature winding is symmetrical the armature magneto motive force can be represented by the line joining K and H. That is to say at any point of the armature periphery the magneto motive force will be proportional to its distance from the zero point 0. Thus at the leading tip L$t$ the value of the armature magnetomotive force will be EG and this will be positive (that is it will oppose the polar magneto motive force at this point).

If the windings are so chosen that at the point L$g$ the polar magneto motive force (represented by MN and having the direction ($a$)) is made equal to the armature magneto motive force (as represented by NM and having the direction ($b$)), then over the whole polar face L$g$—L$t$ the armature magneto motive force will overwhelm the polar magneto motive force and will have the mean value RS in excess of the polar magneto motive force SX. This excess of armature magneto motive force over polar magneto motive force will tend to send a flux represented by the chain dotted line '$f$' into the pole from the armature over the whole polar face L$g$—L$t$. In the same way the magneto motive force over the face T$t$—T$g$ will be represented by the sum of the polar and armature magneto motive forces viz. WV for the polar and VU for the average armature magneto motive force.

If now the restricted part of the trailing horn has such a section that a magneto motive force equal to WT$^1$ is taken up in driving the flux '$f$' through the high reluctance of this part of the pole, there is left a part T$^1$U to drive the flux '$f$' across the airgap under T$t$—T$g$. If the airgap under T$t$—T$g$ is equal to the airgap under L$g$—L$t$ and has the same area, then the part T$^1$U should be approximately equal to the part RS and under these conditions there will be no effective flux passing through the armature from pole to pole, but only a cross 'flux' '$f$' in each pole. There will therefore be no voltage generated at the brushes, and this is the short circuit condition.

It is of course not necessary that the armature and field magneto motive forces should balance one another at the point L$g$ the essential condition being that when the brushes are short circuited, the whole of the field magneto motive force and such part of the armature magneto motive force should be taken up in forcing the flux '$f$' through the high reluctance part of the pole as will leave a residual part T$^1$U to force the flux '$f$' across the airgap T$t$—T$g$ while the residual magneto motive force RS should be just sufficient to force the flux '$f$' across the airgap L$g$—L$t$ thus leaving no magneto motive force available for driving flux across the whole armature from pole to pole, (except such small amount as may be necessary to generate voltage in the armature to balance the internal losses when the short circuit current is flowing).

The conditions as described above will of course be modified if the airgap under the trailing horn is greater or less than the airgap under the leading horn in length and/or area, the description given above being based on equal airgap lengths and equal areas under each horn.

Figs. 2 and 3 show two preferred methods of providing the high reluctance path in the pole. Although in Fig. 1 we show, for clearness, a wide gap T$g$—L$g$; in general this would not be required, but the gap may be made as shown in Fig. 2 or in Fig. 3 and it is not necessary to completely open the gap, as this may be closed by a thin bridge C of iron (as shown by the dotted lines in Fig. 2) this bridge being so thin that it becomes completely saturated by a very small amount of flux. This bridge may be of advantage, in certain cases, in helping to eliminate noise.

In Figs. 4 and 5 constructions are shown whereby the airgap under one horn is greater or less than the airgap under the other horn, in length; but we may vary the length of the airgap under either horn in any way while keeping the average length equal under the two horns, or in any other way which may be desirable in affecting the shape of the characteristic volt-ampere curve or the commutating properties of the machine.

While the poles may be made as shown in Figs. 2 to 5 we may for constructional purposes make the trailing horn separate from the leading horn and bolt each separately to the yoke thus forming a special kind of split pole construction.

As a practical embodiment of this invention, there is shown in Fig. 6 a two pole dynamo with connections as adapted for welding purposes. The poles P$^1$—P$^2$ lie along the horizontal axis, the north pole P$^1$ being on the left hand side, in which case the inter-polar flux will normally pass from left to right across the armature. The direction of rotation of the armature A is assumed to be counterclockwise as shown by the arrow, so that the cross magnetisation of the armature tends to make the top half of the armature of north polarity.

The armature winding (not shown) may be of lap, wave or other well known type and the coils will generally be of normal full pitch, but may, for certain purposes, be made of short pitch.

The poles of the magnet are constructed as described with reference to Figs. 1–5, the horizontal central part of the pole shoe face being cut away parallel or approximately parallel to the axis of the armature, so that little or no flux enters the armature through this cut away part. The width of this cut away part measured at right angles to the polar axis may be different for different machines and is determined by the purpose for which the machine is to be used. The cut away part may be symmetrical with the polar axis, or it may be greater on one side of the polar axis than on the other, depending on the effect desired. It will be seen therefore that, on the assumption that there is no armature reaction to modify the proportions of flux entering the armature at each side of the pole, the flux from, say, the north pole $P^1$ divides into two parts, one part entering the armature from the pole face $Lt$—$Lg$ and the other part entering the armature from the pole face $Tt$—$Tg$ and the proportion of flux entering the armature from each side will depend on the relative reluctance of the paths through the two pole parts T and L. In the dynamo, the magnetic reluctance of the path through the part pole T is increased by cutting away the magnetic material as already described.

In order that the terms 'leading' and 'trailing' may be clearly understood, the 'leading' side of the pole may be defined as that side towards which a point situated on the periphery of the armature outside of the polar arc, approaches as the armature is rotated and the 'trailing' side may be defined as that side from which a point situated on the periphery of the armatures outside of the polar arc, recedes as the armature is rotated.

So far we have considered only the flux entering the armature from the poles, but when the machine is working as a dynamo there will be a cross magnetising effect due to the armature cross ampere turns and this will, in a dynamo, oppose the polar flux over that part of the airgap under the leading horn $Lt$—$Lg$ and will assist the polar flux on that part of the airgap which is under the trailing horn $Tt$—$Tg$. This cross magnetising effect of an armature is of course well known and is the cause of the distortion of the main field in ordinary dynamos and motors, which leads to sparking at the brushes and is usually combated by making the field magnetisation relatively strong and the armature magnetisation relatively weak. In our invention however, we make use of the cross magnetising effect of the armature as described with reference to Fig. 1.

It was mentioned in the description with reference to Fig. 1 that the trailing pole horn must have a very high reluctance, and the value of this reluctance is such that the whole of the field magneto motive force and a portion of the armature magneto motive force are taken up in forcing a flux, equal in amount to that which enters the pole under the leading horn through the trailing horn. Under the conditions stated, this will be the case when the magneto motive force taken up in forcing this flux through the reluctance of the trailing horn is approximately double the field magneto motive force. It will be appreciated that since under these conditions, as much flux is returning to the pole on the leading airgap $Lg$—$Lt$ as is entering the armature on the trailing airgap $Tg$—$Tt$ there will be no effective flux passing through the armature and therefore no voltage generated. This is the short circuit condition and the control of the short circuit current, with a given machine, depends only on the relative strength of the armature magnetisation and the field magnetisation.

The poles are (for a welding dynamo) provided with a series of winding $D^1$—$D^2$ and the magnetic reluctance of the trailing horn would be made of a sufficiently high value to be still effective for limiting the inter-polar flux with currents, down to about, one fourth of the maximum short circuit current, to allow of regulation of the current to suit various sizes of electrodes.

With a series winding only this machine would give a characteristic voltage-ampere curve, starting with a very low voltage (due to residual magnetism) with no current, rising to a maximum voltage determined by the constants of the machine and falling again to zero voltage on short circuit.

When a shunt winding $S^1$—$S^2$ is also added to assist the series winding, the machine will give a characteristic voltage ampere curve with a relatively high open circuit voltage, and a drooping characteristic having a definite value for the short circuit current.

If, for example, the shunt winding added to the series winding is made of such value, that in the normal working of the dynamo for a given voltage the magneto motive force due to it just balances the magneto motive force due to the belt of conductors under the leading pole face $Lg$—$Lt$, then the machine will give constant current for all values of the voltage between the given voltage and zero voltage and further, the no load or open circuit voltage may be less than the working voltage so that there is no risk of damage to the shunt field on open circuit due to over voltage, such as may occur in certain other types of constant current dynamo. As the voltage falls (owing to the arc becoming shorter, or being short circuited) the shunt magneto motive force will no longer overwhelm completely the residual armature magneto motive force, but will do so to a smaller extent (except on short circuit) and will generate the necessary lower voltage while the armature current remains substantially constant.

Further control can be obtained by altering the position of the brushes so that a belt of armature conductors act either with or against the series winding on the poles and the control can be still further accentuated by fitting the machine with interpoles having a suitable pole arc, which, in addition to correcting any tendency to spark, can be made to add or subtract part of the interpolar flux to that of the main field, thereby affecting the voltage generated. These interpoles I are provided with a series winding $F^1$—$F^2$.

For a practical welding generator we find that the value of the magneto motive force generated by the series windings should be about equal to the armature magneto motive force at the point Lg (Fig. 1) and as shown at MN under short circuit conditions. When the machine is open circuited, that is, when no current is flowing in the armature the shunt windings $S^1$ $S^2$ should give about the same or a slightly greater magneto motive force than that given by the series windings $D^1$ $D^2$ on short circuit. It should be understood however that we do not limit ourselves to these proportions of windings which are given only by way of example, but may vary the proportions of the windings or may omit or reverse any of the windings as may be desirable for the purpose in view.

In Fig. 6 interpoles I are shown and we find it desirable in some cases to incorporate these in the machine, even although their use may not be necessary for commutating purposes, as they form a very ready means of adjusting the short circuit current and characteristic curve of the machine merely by shifting the brushes within the commutating zone. They also assist in stabilizing the machine by eliminating the current in the short circuited coil under the brush. These short circuited coils cut the cross leakage field of the armature and thus generate currents which may be of considerable magnitude, and as these currents produce, or tend to produce, a flux in the armature opposing the main field flux, they thus tend to make the machine very unstable. The inter-poles overcome this by neutralising the effect of the cross leakage field on the short circuited coils thus eliminating the currents which would otherwise be generated thereby.

Although for the purpose of description we have assumed that under short circuit conditions the armature magnetomotive force and the pole magnetomotive force balance one another at the point Lg, our invention is not limited by this condition, and the relative strength of pole and armature magnetisation may be such that either the pole magnetisation or the armature magnetisation is predominant at this point, the essential point being that under short circuit conditions, the reluctance of the trailing horn must be such that the whole of the field magnetomotive force and a large part of the armature magnetomotive force is taken up in driving the cross flux through this extra reluctance leaving the remainder of the armature magnetomotive force to drive the cross flux through the remaining reluctance of the cross polar circuit, so that there is no effective flux traversing the armature from pole to pole and therefore no voltage is generated at the brushes.

Although we have described a dynamo particularly applicable for generating current for arc welding, our invention is not limited to this, but may be used for any other purpose for which constant current generators are applicable.

We claim:—

1. A constant current dynamo comprising, in combination, an armature, an armature winding on said armature, and at least one pair of poles, each pole having two pole horns, a leading pole horn and a trailing pole horn, the magnetic reluctance of the trailing pole horn being so much higher than that of the leading pole horn, that, under short circuit conditions, the flux in the leading horn will be reversed due to armature reaction while the trailing horn will be so saturated that the flux thereof will be substantially equal to the flux in the leading horn, and thereby the inter-polar flux will be reduced to an amount which is just sufficient to maintain the short circuit current circulating in the armature winding.

2. A constant current dynamo comprising, in combination, an armature, an armature winding on said armature, and at least one pair of poles around said armature, each pole having two parts, a trailing part with a high magnetic reluctance path and a leading part with a low magnetic reluctance path, and said parts being spaced different distances from the armature, so arranged that, under short circuit conditions, cross flux due to armature reaction will reverse the flux in the leading part and the trailing part will be so saturated that the flux thereof will be substantially equal to that of the leading part and thereby the total flux passing through the armature from pole to pole will be reduced to an amount which is just sufficient to keep the short circuit current circulating in the armature winding.

3. A constant current dynamo comprising, in combination, an armature, an armature winding on said armature, and at least one pair of poles around said armature, each pole having two parts, a trailing part with a high magnetic reluctance path and a leading part with a low magnetic reluctance path, and said parts having polar faces of different areas, so arranged that, under short circuit conditions, cross flux due to armature reaction will reverse the flux in the leading part and the trailing part will be so saturated that the flux thereof will be substantially equal to that of the leading part and thereby the total flux passing through the armature from pole to pole will be reduced to an amount which is just sufficient to keep the short circuit current circulating in the armature winding.

4. A constant current dynamo comprising, in combination, an armature, an armature winding on said armature, at least one pair of poles around said armature each pole having two parts, a trailing part with a high magnetic reluctance path and a leading part with a low magnetic reluctance path, a series winding on said poles and a shunt winding on the poles arranged to assist the series winding, so arranged that, under short circuit conditions, cross flux due to armature reaction will reverse the flux in the leading part and the trailing part will be so saturated that the flux thereof will be substantially equal to that of the leading part and thereby the total flux passing through the armature from pole to pole will be reduced to an amount which is just sufficient to keep the short circuit current circulating in the armature winding.

5. A constant current dynamo comprising, in combination, an armature, an armature winding on said armature, at least one pair of poles around said armature, each pole having two parts, a trailing part with a high magnetic reluctance path and a leading part with a low magnetic reluctance path and interpoles, so arranged that, under short circuit conditions, cross flux due to armature reaction will reverse the flux in the leading part and the trailing part will be so saturated that the flux thereof will be substantially equal to that of the leading part and thereby the total flux passing through the armature from pole to pole will be reduced to an amount which is just sufficient to keep the short circuit current circulating in the armature winding.

6. A constant current dynamo comprising, in combination, an armature having an armature winding thereon, at least one pair of poles around said armature, each pole having two parts, one with a high magnetic reluctance path and the other with a low magnetic reluctance path, a series winding on said poles, a shunt winding on the poles arranged to assist the series winding and interpoles, so arranged that, under short circuit conditions, cross flux due to armature reaction will reverse the flux in the leading part and the trailing part will be so saturated that the flux thereof will be substantially equal to that of the leading part and thereby the total flux passing through the armature from pole to pole will be reduced to an amount which is just sufficient to keep the short circuit current circulating in the armature winding.

7. A constant current dynamo comprising, in combination, an armature, having an armature winding thereon, a pair of poles, each pole having two parts, a leading part and trailing part, the leading part being of larger cross sectional area than the other, and a field winding generating flux in said poles, so constructed and arranged that, under short circuit conditions, the flux in the leading part will be reversed due to armature reaction while the trailing part will be so saturated that the flux thereof will be substantially equal to that of the leading part and thereby the inter-polar flux will be reduced to an amount which is just sufficient to maintain the short circuit current circulating in the armature winding.

8. A constant current dynamo comprising, in combination, an armature having an armature winding thereon, a pair of poles, each pole having two parts, a leading part and a trailing part, the trailing part having a part of greatly reduced cross-sectional area forming a high magnetic reluctance path, interpoles, a field winding on both the poles and interpoles connected in series with the armature winding, and a shunt winding on the poles only, arranged to assist the series winding thereon, so arranged that, under short circuit conditions, cross flux due to armature reaction will reverse the flux produced by the field winding in the leading part and the trailing part will be so saturated that the flux thereof will be substantially equal to that of the leading part and thereby the interpolar flux will be reduced to an amount which is just sufficient to keep the short circuit current circulating in the armature winding.

9. A dynamo of the constant current type comprising, in combination, an armature, armature conductors on said armature, poles with field windings thereon, said poles each having two horns, a leading pole horn with a low magnetic reluctance path and a trailing pole horn with a high magnetic reluctance path, so proportioned that, when the dynamo is short circuited, the magneto-motive force produced by the armature conductor overwhelms the magneto-motive force produced by the field winding in the leading pole horn and the flux in the trailing pole horn is kept by the reluctance thereof substantially equal to the flux in the leading pole horn, thereby reducing the inter-polar flux to an amount which is just sufficient to keep the short circuit current circulating in the armature winding.

10. A dynamo of the constant current type comprising, in combination, an armature, armature conductors on said armature, poles with field windings thereon said poles each having two horns, a leading pole horn with a low reluctance part and a trailing pole horn with a high reluctance part, said horns being so arranged and proportioned that, when the dynamo is short circuited, the magneto-motive force produced by the armature conductors overwhelms the magneto-motive force produced by the field winding in the leading pole horn, the quotient of the difference between the magneto-motive forces in the leading pole horn divided by the reluctance of this horn being substantially equal to the quotient of the sum of these magneto-motive forces in the trailing pole horn divided by the reluctance of this horn.

In testimony whereof we affix our signatures.

JAMES COLQUHOUN MACFARLANE.
WILLIAM ALLAN MACFARLANE.